US005473588A

United States Patent [19]
Tanaka et al.

[11] Patent Number: 5,473,588
[45] Date of Patent: Dec. 5, 1995

[54] SIGNAL REPRODUCING APPARATUS PROVIDING PLL CIRCUIT CONTROLLED BY DRUM MOTOR SPEED

[75] Inventors: Masato Tanaka; Han Min-Jae, both of Tokyo, Japan

[73] Assignee: Sony Corporation, Tokyo, Japan

[21] Appl. No.: 414,039

[22] Filed: Mar. 30, 1995

Related U.S. Application Data

[63] Continuation of Ser. No. 19,299, Feb. 18, 1993, abandoned.

[30] Foreign Application Priority Data

Feb. 20, 1992 [JP] Japan ..................................... 4-069298

[51] Int. Cl.⁶ ...................................................... G11B 5/09
[52] U.S. Cl. ............................... 369/47; 360/73.02
[58] Field of Search .................... 369/47, 48, 50, 369/60; 360/51, 73.02, 73.03, 73.04, 73.08

[56] References Cited

U.S. PATENT DOCUMENTS 4,413,289  11/1983  Weaver et al. ................................ 360/51
4,851,932   7/1989  Scheer et al. .

FOREIGN PATENT DOCUMENTS 0228646   7/1987  European Pat. Off. ........ G11B 20/10
0286727  10/1988  European Pat. Off. ........ G11B 20/10
0319218   6/1989  European Pat. Off. ........ G11B 20/14

*Primary Examiner*—Georgia Y. Epps
*Assistant Examiner*—P. W. Huber
*Attorney, Agent, or Firm*—Jay H. Maioli

[57] ABSTRACT

A signal reproducing apparatus for reading out signals recorded along with clock signals on a recording medium. The relative velocity between a magnetic tape and magnetic heads mounted on a rotary drum is sensed by a rotary drum rotational velocity sensor and the center oscillation frequency of a VCO in a clock-reproducing PLL circuit of signal reproducing circuitry is changed in accordance with the sensed relative velocity for controlling the center oscillation frequency to be equal to the frequency of the clock components of the reproduced RF signals. The clock signal components may be reproduced as usual even though the frequencies of the clock components of the playback RF signals are changed. Moreover, fluctuations in the relative velocity between the magnetic tape and the magnetic head may be tolerated to diminish the load on the velocity servo control operation as well as to reduce power consumption and expedite the operation.

15 Claims, 3 Drawing Sheets

SIGNAL REPRODUCING APPARATUS PROVIDING PLL CIRCUIT CONTROLLED BY DRUM MOTOR SPEED

This is a continuation of application Ser. No. 08/019,299, filed Feb. 18, 1993, now abandoned.

BACKGROUND OF THE INVENTION

1. Field of the Invention

This invention relates to a signal reproducing apparatus and a signal reproducing method for reading out signals recorded along with clock signal components on a recording medium. The present invention is applicable to such signal reproducing apparatus in which fluctuation may be incurred in the relative velocity between the signal recording medium, such as a magnetic tape, and signal readout means, such as a rotary head.

2. Description of the Related Art

There have hitherto been known a variety of signal reproducing apparatus, such as those employing magnetic tapes, magnetic discs or optical discs, as recording media. In a majority of cases, the relative velocity between the signal readout means, such as the magnetic head or the optical pickup head, and the recording medium, is servo-controlled to a preset format velocity. The frequency of the clock signal components of the signals reproduced from signal readout means is also servo-controlled to a constant value.

There is a system consisting in storing signals read from a recording medium in a buffer memory for subsequent reading at a constant rate for reproduction. With such system, the signals may be effectively reproduced even though the relative velocity between the recording medium and signal readout means is fluctuated to a certain extent.

In the case of a small-sized rotary head type digital tape recorder (DAT), as electronic equipment, it may be contemplated to run the capstan and a rotary head in rotation by a sole motor. If the tape running speed is varied with such apparatus, the rotational velocity of the rotary head and hence the relative velocity between the tape and the head is also changed.

If the relative velocity between the recording medium, such as the tape, and the signal readout means, such as the rotary head, is changed, the frequency of the clock components of the signals obtained from the signal readout means is also changed. Such fluctuations in frequency tend to produce disengagement from a locking range of a phase locked loop circuit (PLL circuit) employed in the clock reproducing circuit (clock signal extracting tuning circuit) to render it impossible to carry out effective clock reproduction.

In the PLL circuit in general, a capturing range which is centered about the clock frequency at the time of standard reproduction and which has a frequency of transition to a locked state as a boundary frequency, and a locking range which is outside the capturing range and which has a frequency of disengagement from the locking state as a boundary frequency, are set. If the relative velocity of the rotary head with the tape is changed significantly so that the clock frequency is outside the locking range, the PLL is disengaged from the locked state so that the normal operation cannot be achieved. If the fluctuations of the clock components in the playback signals cannot be absorbed sufficiently by the PLL circuit, adverse effects such as increased signal error rate is incurred.

If, in a signal reproducing system in which tape running and head rotation are realized by separate motors, signals are read while the tape is fed rapidly or rewound to retrieve a desired tape position, the conventional practice has been to control the rotational velocity of the rotary head for compensating fluctuations in the playback clock frequency. Since a certain setting time is required for correcting the rotational velocity of the rotary head at the time of operational transition to the rapid feed or rewind, quick transition to the new operating state cannot be achieved.

In the case of a servo operation of maintaining a constant relative velocity between the signal recording medium and the signal readout head, control operations of acceleration and deceleration are repeatedly performed with increase load on the servo or circuit system with concomitant power consumption.

OBJECTS AND SUMMARY OF THE INVENTION

In view of the above-described status of the art, it is an object of the present invention to provide a signal reproducing apparatus in which fluctuations in the relative velocity between the recording medium and signal reproducing means is tolerated to diminish a load on the servo control system and power consumption as well as to expedite the operation, and in which effective clock reproduction may be achieved even though the clock frequency of the playback signals is fluctuated by changes in the relative velocity.

According to the present invention, there is provided a signal reproducing apparatus for reading signals by signal readout means from a recording medium on which the signals are recorded along with clock components, comprising velocity detection means for detecting the relative velocity between the recording medium and the signal readout means, and clock reproducing means for reproducing the clock components responsive to output signals from said signal readout means, the center oscillation frequency of the clock reproducing means being controlled responsive to output velocity detection signals from the velocity detection means.

The clock reproducing means may be a phase locked loop circuit (PLL circuit), the voltage controlled oscillator (VCO) of which has its center oscillation frequency (tuning frequency or self-running frequency) variably controlled so as to be coincident with the frequency of the clock components in the signals read out from the signal readout means.

In the case of a signal reproducing apparatus, such as a small-sized portable single driving motor type rotary head tape recorder, in which signals read out from the tape are temporarily stored in a buffer memory and subsequently read at a constant rate, it may be contemplated to variably control the tape running velocity as a function of the data volume stored in the buffer memory, that is the residual data volume in the buffer memory. Although, this alters the relative velocity between the tape and the rotary head, the clock components may be reproduced by variably controlling the center oscillation frequency of the VCO of the clock-reproducing PLL circuit responsive to changes in the relative velocity.

The present invention may be applied to a rotary head type tape recorder driven by two or more motors. The signal recording medium may also be an optical disc or a magnetic disc, besides the magnetic tape, while signal readout means may also be an optical pickup head instead of the magnetic head.

By controlling the center oscillation frequency of VCO of the clock reproducing means, such as the PLL circuit, responsive to the relative velocity between the signal recording medium and the signal readout head, for shifting the frequency locking range for tuning the center oscillation frequency with the fluctuations in the clock frequency of the signals produced by the signal readout head, the PLL may be improved in lock reproducing characteristics to render it possible to realize normal clock reproduction.

Other objects and advantages of the present invention will become apparent from the following description of preferred embodiments and the claims.

DETAILED DESCRIPTION OF THE PREFERRED EMBODIMENTS

Figure 1:
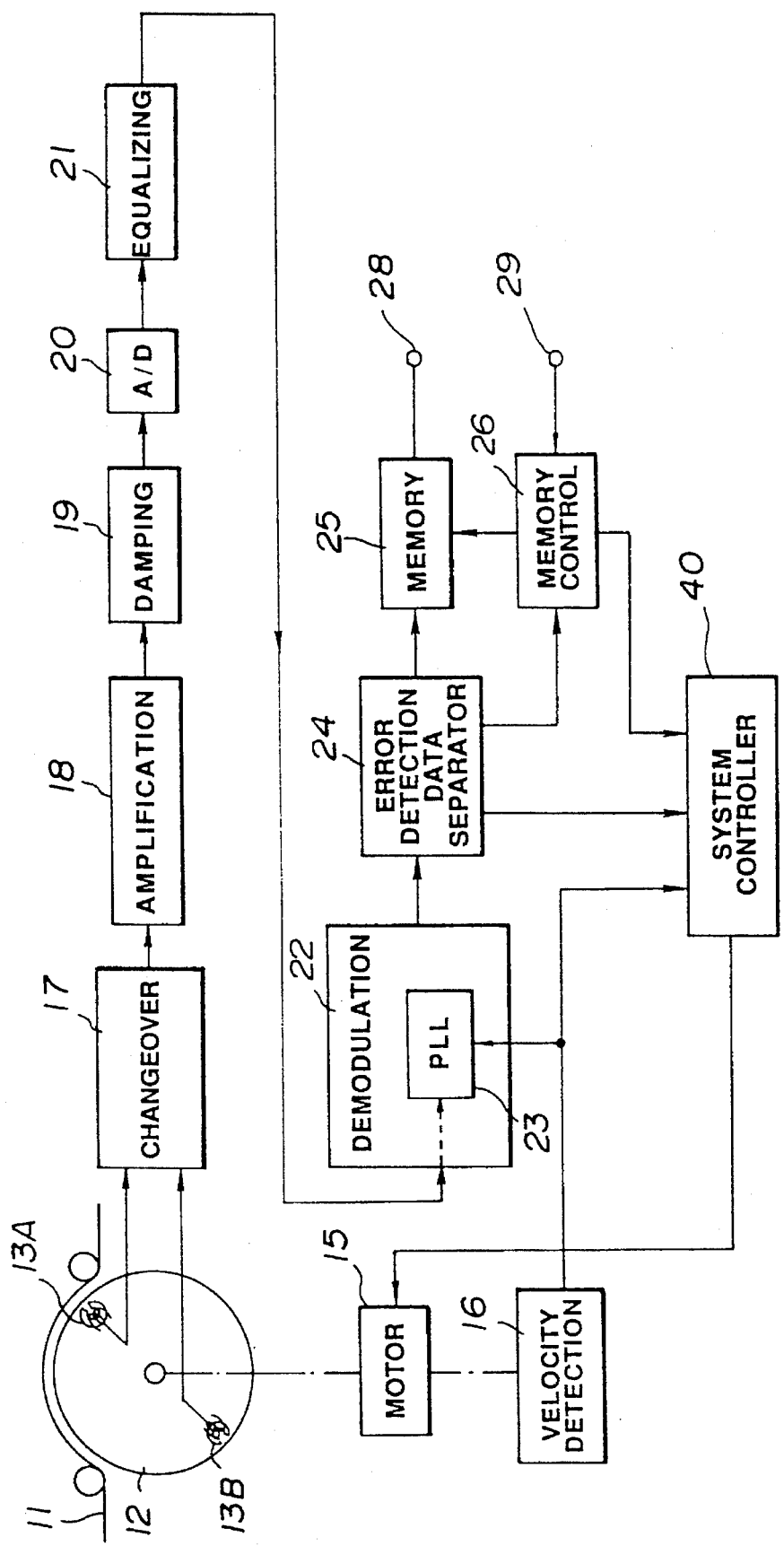
FIG. 1 is a schematic block diagram showing an arrangement of a small-sized rotary head type digital audio tape recorder (DAT) according to an embodiment of the present invention.

Referring to the drawings, preferred embodiments of the present invention will be explained in detail.

FIG. 1 shows, in a schematic block circuit arrangement, a small-sized portable rotary head type DAT, as proposed by the present Assignee in the JP Patent Application Nos.1-318363 and 3-50518, as an embodiment of a signal reproducing apparatus according to the present invention.

Referring to FIG. 1, there is shown, as a signal reproducing system for DAT, a magnetic tape 11 which is wrapped with an angle of e.g. 90° around and caused to run on the outer periphery of a rotary head drum 12. On the rotary head drum 12, a pair of magnetic heads 13A, 13B are mounted with an angular distance of 180° from each other. An electric motor 15 causes the rotary head drum 12 to be run in rotation, while also causing a capstan, not shown, to be run in rotation for running the magnetic tape 11. A drum velocity sensor 16 for the rotary head drum 12 is provided for sensing the relative velocity between the magnetic tape 11 and the magnetic heads 13A, 13B. Although it would be preferred that the velocity component of the magnetic heads 13A, 13B rotated on the magnetic tape 11 be significantly higher than the velocity component of the running magnetic tape 11, it is necessary to take account of the tape running velocity as well for more precise velocity detection.

Output signals from the magnetic heads 13A, 13B for reading out signals recorded on the magnetic tape 11 are changed over by a changeover circuit 17 and amplified by a playback amplifier 18 so as to be transmitted via a signal level adjuster 19 to an A/D converter 20 for being converted into digital signals which are equalized by an equalizer 21 before being transmitted to a demodulator 22. Within the demodulator 22, part of input signals are supplied to a phase locked loop (PLL) 23 constituting a clock reproducing circuit for reproducing clock signals so that signal demodulation and data readout etc. is performed based on the reproduced clock signals.

Output signals from velocity sensor 16, sensing the relative velocity between the magnetic tape 11 and the magnetic heads 13A, 13B, herein referred to as the rotational velocity of the rotary head drum 12, are supplied to PLL circuit 23 for controlling the center oscillation frequency (tuning frequency of free-running frequency) or a VCO of the PLL circuit 23 in accordance with the sensed relative velocity. More concretely, a predetermined coefficient as a variant of an offset of a control voltage for a voltage-controlled oscillator in the PLL circuit is multiplied so as to be supplied to the PLL loop.

Demodulated output signals from demodulator 22 are transmitted to an error detection and data separation circuit 24. An error detecting and correcting operation is performed on an error detection signal contained in the demodulated signal. The error-corrected signals are supplied to a buffer memory 25 while the address information is supplied to a memory control circuit 26 or to a system controller 40 as will be explained below. Signals read out from buffer memory 25 via output terminal 28 are processed with decoding etc., if need be, before being D/A converted and reproduced as playback analog signals. Meanwhile, readout clocks of a constant frequency are supplied via terminal 29 to the memory control circuit 26 which outputs time base corrected analog audio signals.

To system controller 40 are supplied output signals from velocity sensor 16 for sensing or detecting the relative velocity between the magnetic tape 11 and the magnetic heads 13A, 13B, herein referred to as the rotational velocity of the rotary head drum 12 and information signals concerning a stored data volume from memory controller 26. System controller 40 outputs signals for controlling the operation of various parts, such as motor servo control signals in accordance with the stored data volume in the memory 25, which are supplied to motor 15.

Figure 2:
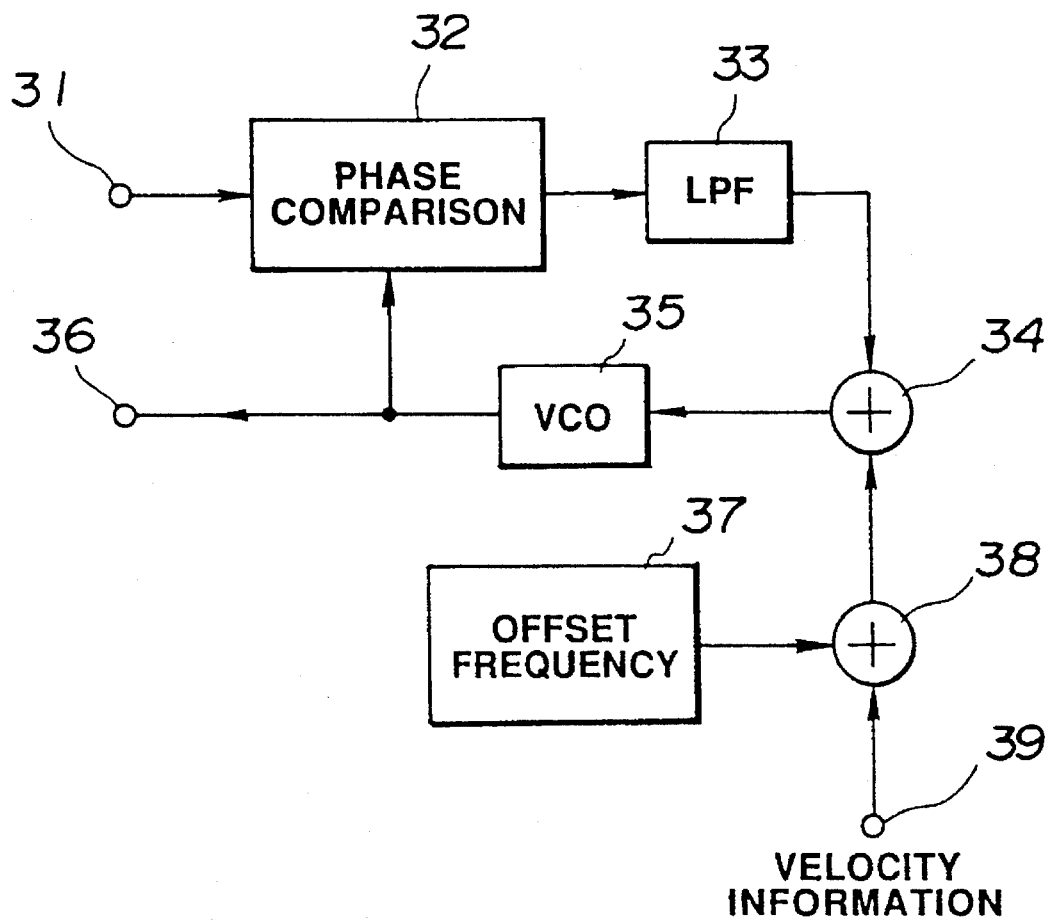
FIG. 2 is a block diagram showing a PLL circuit employed in the small-sized rotary head type DAT shown in FIG. 1.

FIG. 2 shows a block diagram of the above-mentioned PLL circuit 23. Playback RF signals from equalizer 21 shown in FIG. 1 are supplied to input terminal 31 of FIG. 2. These input signals are supplied to a phase comparator 32 for phase comparison with output oscillation signals from a voltage controlled oscillator (VCO) 35. Output signals from phase comparator 32 are supplied to a low-pass filter (LPF) 33 comprising, as circuit components, an integrating element $K_v/s$, a proportional element $K_p$, etc. Output signals from LPF 33 are supplied via additive node 34 to a control input terminal of VCO 35. An offset frequency control signal from a circuit outputting a control signal associated with an offset frequency is supplied via additive node 38 to additive node 34. The frequency control signal associated with the velocity information from terminal 39 is added at the additive node 38 to the offset frequency control signal.

It is assumed that the standard relative speed between the magnetic tape 11 and the magnetic heads 13A, 13B, herein the rotational velocity of the rotary head drum 12, is $v_0$, and that the playback clock frequency at the time of the standard velocity $v_0$ is $f_0$. It is also assumed that the relation $$f_0 = K \times v_0$$

K being a constant, holds between the standard velocity $v_0$ and the reference playback frequency $f_0$. The velocity of the motor 15 is servo controlled so that the stored data volume in buffer memory 25, that is the residual data volume in the buffer memory 25, is maintained constant. The rotational velocity of the rotary head drum 12 is changed responsive to the velocity control servo operation. It is contemplated that, when the above-mentioned relative velocity, that is the detected rotational velocity of the rotary head drum 12, is $v_x$, the frequency of the clock components in the RF signals read by the magnetic heads 13A, 13B becomes $K \times v_x$, K being a constant. The center oscillation frequency or tuning frequency $f_{cent}$ of PLL circuit 23 is controlled to be tuned to $K \times v_x$ responsive to changes in the clock frequency in the RF signal accompanying such velocity change. Since it is thought that the detected relative velocity $v_x$ is given by $$v_x = v_0 + \Delta V$$

and hence is the sum of the standard velocity $v_0$ and velocity fluctuations $\Delta v$, it suffices to cause the center oscillation frequency $f_{cent}$ of the PLL circuit 23 to be changed so that $$\begin{aligned} f_{cent} &= K \times v_x \\ &= K \times (v_0 + \Delta v) \\ &= f_0 + K \times \Delta v \end{aligned}$$

FIG. 2 shows an arrangement of the PLL circuit for clock reproduction. By supplying a frequency controlling voltage corresponding to the offset frequency $f_0$ of the PLL circuit from circuit 37 and a frequency control voltage corresponding to a velocity change $\Delta v$ ($\times K$) derived from the velocity information supplied via terminal 39 to additive node 38 and by supplying the resulting sum signal via additive node 34 to VCO 35, the center oscillation frequency is control led to conform to the sensed velocity $v_x$.

In this manner, by controlling the center oscillation frequency of VCO 35 on the real time basis depending on the detected relative velocity, herein the rotational velocity of the rotary head drum 12, the frequency of the clock components in the RF signals read by the magnetic heads 13A, 13B is reliably included within a capture or lock range of VCO 35 to assure a normal clock-reproducing operation.

An example of a servo controlling operation of the motor 15 in conformity to a data volume stored in buffer memory 25, or the residual data volume in the buffer memory 25, is hereinafter explained by referring to FIG. 3. The storage capacity of the buffer memory 25 is assumed to be equal to e.g. 32 tracks.

Figure 3:
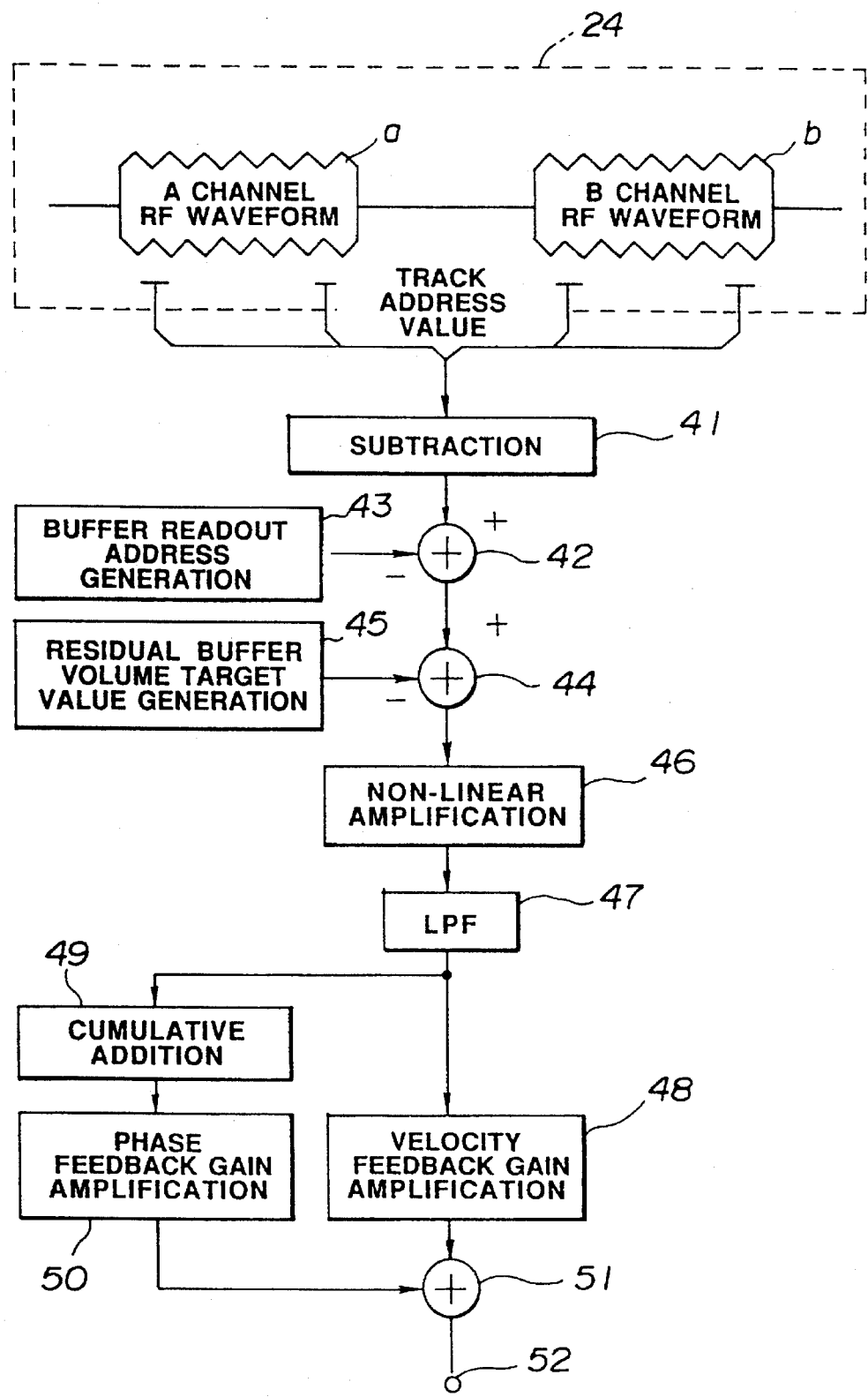
FIG. 3 is a block diagram showing a controller for illustrating a velocity speed controlling operation for DAT.

In FIG. 3, signals intermittently read from magnetic tape 11 by the magnetic heads 13A, 13B with rotation of the rotary head drum 12 of FIG. 1 are supplied to an error detection and data separation circuit 24 where the address information such as track addresses are separated and supplied to a divider 41. The divider divides the track address supplied thereto by the storage capacity of the buffer memory 25, that is the number of tracks equal to 32. The remainder resulting from the division is supplied, as a write address in the buffer memory 25, to a subtractor 42, where the readout address from the buffer readout address generator 43 provided in the memory control circuit 26 is subtracted from the readout address. The resulting difference corresponds to the data volume stored in the buffer memory 25, that is the residual data volume in the buffer memory 25.

The difference from subtractor 42 is supplied to the next subtractor 44, while a reference value or desired or target value of the stored data volume or residual data volume in the buffer memory 25 is supplied from a residual data volume target value generator 45 to the subtractor 44 for subtraction. The target value may be set so as to be approximately equal to one half the storage capacity of the buffer memory 25, that is 32/2 or 16 tracks. The output from subtractor 44 is an approximate value of the difference between the above-mentioned target value and the actual residual data volume in the buffer memory 25. The difference output is supplied via a non-linear amplifier 46 to a low-pass filter (LPF) 47. The non-linear amplifier has characteristics such that its amplification factor becomes larger when the actual residual data volume in the buffer memory 25 is deviated from the desired value than when the actual residual data volume is close to the desired value.

An output from LPF 47 is supplied to a velocity feedback gain amplifier 48 to effect amplification for controlling the running velocity of the magnetic tape 11. The output of LPF 47 is also supplied via cumulative addition unit 49 to a phase feedback gain amplifier 50 to effect amplification for phase control of the magnetic tape 11. Outputs from amplifiers 48, 50 are summed in an additive node 51 and output at terminal 52 as a buffer memory residual data volume control feedback data for controlling the rotational velocity and the rotational phase of the motor 15.

For controlling the residual data volume in the buffer memory so as to be equal to the above-mentioned target value, it is necessary to servo control the capstan which causes the magnetic tape 11 to be run in operation. Since the capstan and the rotary head drum 12 are run in operation by the sole motor 15, if the capstan is servo-controlled, rotary head drum 12 is controlled simultaneously, so that the relative velocity between the magnetic tape 11 and the magnetic heads 13A, 13B is changed. Specifically, the tape feed rate is controlled to be in a range of $\pm 10\%$ of a standard rate, so that the frequency of clock components of the playback RF signals is correspondingly changed within the range of $\pm 10\%$ of the standard frequency.

In the embodiment illustrated, the center oscillating frequency of the PLL circuit 23 is changed with changes in the relative velocity for matching the center oscillating frequency of the PLL with the frequency of the clock components of the playback RF signals for assuring a satisfactory PLL operation. The result is inhibition of adverse effects, such as increased signal error rate.

The present invention may be applied not only to a sole driving motor system but to a reproducing apparatus in which the relative velocity between the magnetic tape and the rotary head is fluctuated by disturbances or load fluctuations to the rotary head driving motor and more generally to a reproducing apparatus in which the relative velocity between the recording medium and the signal readout head is changed or fluctuated. In this manner, when the walking of a person carrying a small-sized portable equipment or vibrations of a vehicle produces disturbances to the equipment in the form of acceleration on the order of several Hz frequency, these disturbances may be used in the form of a relative velocity information of the recording medium for controlling the center oscillation frequency of the PLL.

On the other hand, if the signals are to be reproduced as the tape is fed rapidly or rewound, as described hereinabove, the PLL operation is carried out normally, so that it becomes unnecessary to change over the rotary head velocity or to maintain a constant relative velocity of the rotary head with respect to the recording medium and hence the operating mode can be changed over rapidly. This also is effective in preventing power consumption from being increased due to the necessity of performing a servo control operation for maintaining the relative velocity.

Moreover, even in the case of a reproducing apparatus for a disc driven at a constant linear velocity(CLV), it becomes possible to lower CLV servo control precision and to realize effective playback even with a "rough" servo in order to lower circuit costs and power consumption as well as to simplify the arrangement.

It is to be noted that the present invention is not limited to the above-described embodiment. For example, the present invention may be applied not only to the small-sized rotary head type DAT, but to a variety of electronic equipment, above all, battery-driven type small-sized electronic equipment, such as a small-sized disc reproducing apparatus or small-sized tape recorder.

What is claimed is:

1. A signal reproducing apparatus for reading signals containing components of clock signals recorded on a recording medium, comprising:

motor means for transporting the recording medium;

signal readout means including a movable element driven by said motor means for reproducing signals recorded on said recording medium, velocity detection means connected to said motor means for detecting a relative velocity between said recording medium and said signal readout means and outputting a velocity detection signal corresponding to the detected relative velocity, clock signal reproducing means for reproducing said clock signals from the reproduced signals from said signal readout means and outputting a reproduced clock signal, said clock signal reproducing means having a frequency capturing range shifted in accordance with said velocity detection signal, a signal demodulating circuit for demodulating said reproduced signals from said signal readout means based on said reproduced clock signals from said clock signal reproducing means, buffer memory means receiving demodulated reproduced signals from said signal demodulating circuit for temporarily storing said demodulated reproduced signals, and control means connected to said motor means and said velocity detection means for varying the relative velocity between said recording medium and said signal readout means, wherein said control means includes residual buffer target value generating means for storing a target value representing a predetermined portion of the storage capacity of said buffer memory and includes means for deriving a difference value between said target value and a quantity of demodulated reproduced signals stored in the buffer memory means and for controlling the buffer memory means to output the stored demodulated reproduced signals at a constant rate, wherein said difference value is used to control said motor means.

2. A signal reproducing apparatus according to claim 1 wherein said clock signal reproducing means comprises a phase locked loop circuit (PLL circuit) an oscillation frequency of which is shifted for altering said frequency capturing range.

3. A signal reproducing apparatus according to claim 2 wherein an offset signal is added to said velocity detection signal supplied to said PLL circuit for shifting said oscillation frequency of said PLL circuit.

4. A signal reproducing apparatus according to claim 1 wherein said recording medium is an optical disc.

5. A method for reproducing signals in which signals recorded on a recording medium with components of clock signals are read out by signal readout means that moves relative to said recording medium, comprising:

detecting a relative velocity between said recording medium and said signal readout means, receiving a reproduced signal from said signal readout means, shifting a frequency capturing range of a clock signal reproducing means, reproducing said components of clock signals from reproduced signals from said signal readout means using said clock signal reproducing means in accordance with said detected relative velocity, demodulating the reproduced signals based on said reproduced components of clock signals from said clock signal reproducing means, storing said demodulated reproduced signals in a buffer memory, generating a target value representing a predetermined portion of the storage capacity of the buffer memory, deriving a difference value between the target value and an amount of demodulated reproduced signals stored in the buffer memory, varying the relative velocity between said recording medium and said signal readout means in response to the derived difference value, and outputting the stored demodulated reproduced signals at a constant rate.

6. A signal reproducing apparatus according to claim 1 further comprising a low pass filter receiving said difference value for producing a filtered signal fed to control said motor means.

7. A signal reproducing apparatus according to claim 1 wherein the signals recorded on the recording medium are in the form of a plurality of slant tracks along the length of the recording medium and wherein the capacity of the buffer memory corresponds to data recorded in a predetermined plurality of the slant tracks.

8. A signal reproducing apparatus according to claim 7 wherein the target value is a data amount corresponding to one-half the capacity of the buffer memory.

9. A signal reproducing apparatus according to claim 7 wherein said plurality of slant tracks equals 32.

10. A signal reproducing apparatus according to claim 9 wherein the target value is a data amount corresponding to data recorded in 16 slant tracks.

11. A method for reproducing signals according to claim 5 further comprising the step of low-pass filtering the derived difference value before varying the relative velocity in response thereto.

12. A method for reproducing signals according to claim 5 further comprising the step of selecting the buffer memory to have a capacity corresponding to an amount of data recorded in a predetermined plurality of slant tracks on the recording medium.

13. A method for reproducing signals according to claim 12 further comprising the step of selecting said target value to an amount of data corresponding to one-half the capacity of the buffer memory.

14. A method for reproducing signals according to claim 12 further comprising the step of selecting the plurality of slant tracks to be equal to 32.

15. A method for reproducing signals according to claim 14 further comprising the step of selecting said target value to correspond to an amount of data recorded in 16 slant tracks.

* * * * *